Nov. 4, 1969    J. GORBY    3,476,037
FOOD CANNING MACHINE
Filed April 5, 1968    7 Sheets-Sheet 1
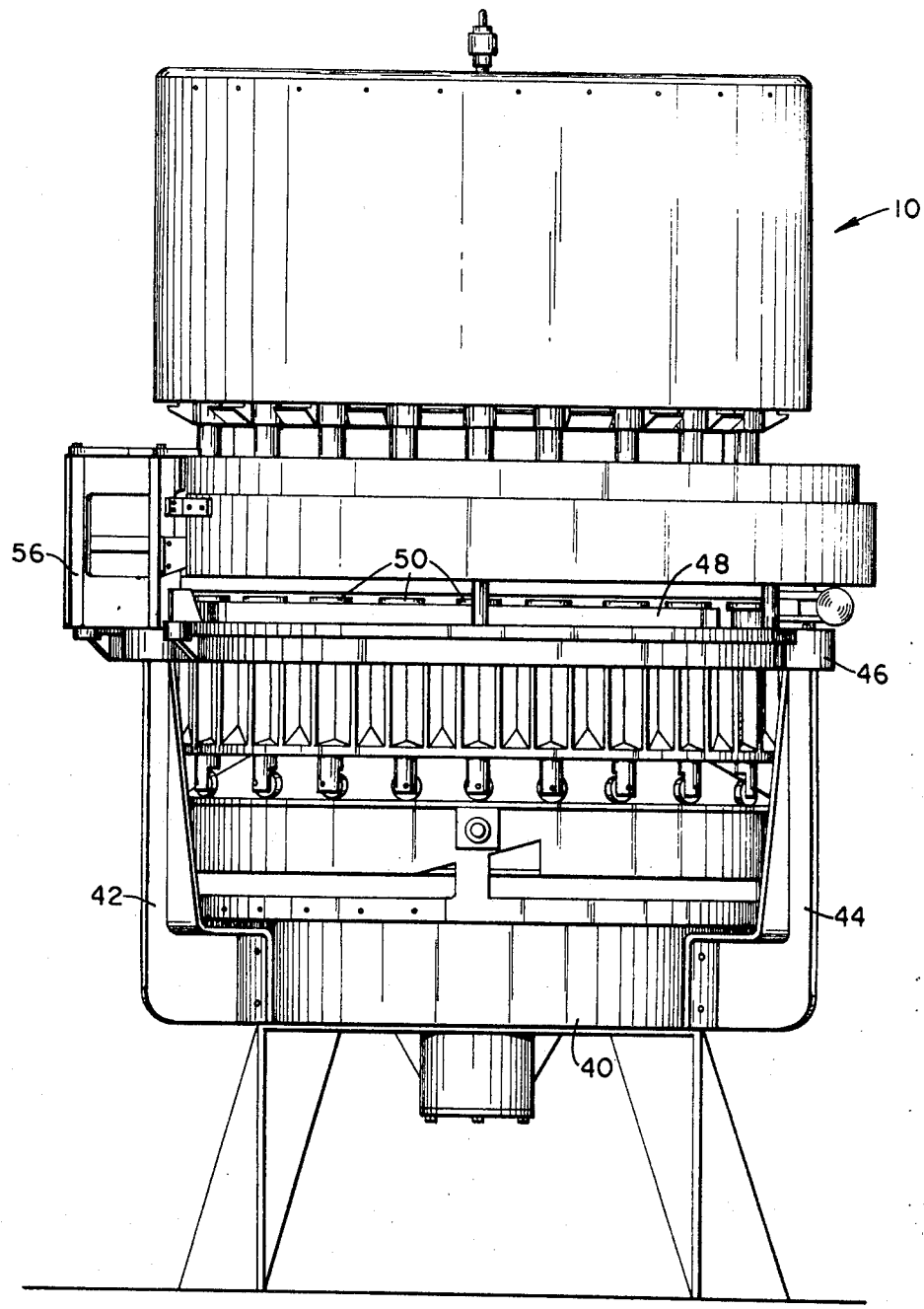
FIG_1
INVENTOR.
JACK GORBY
BY
Mellin, Moore & Weissenberger
ATTORNEYS

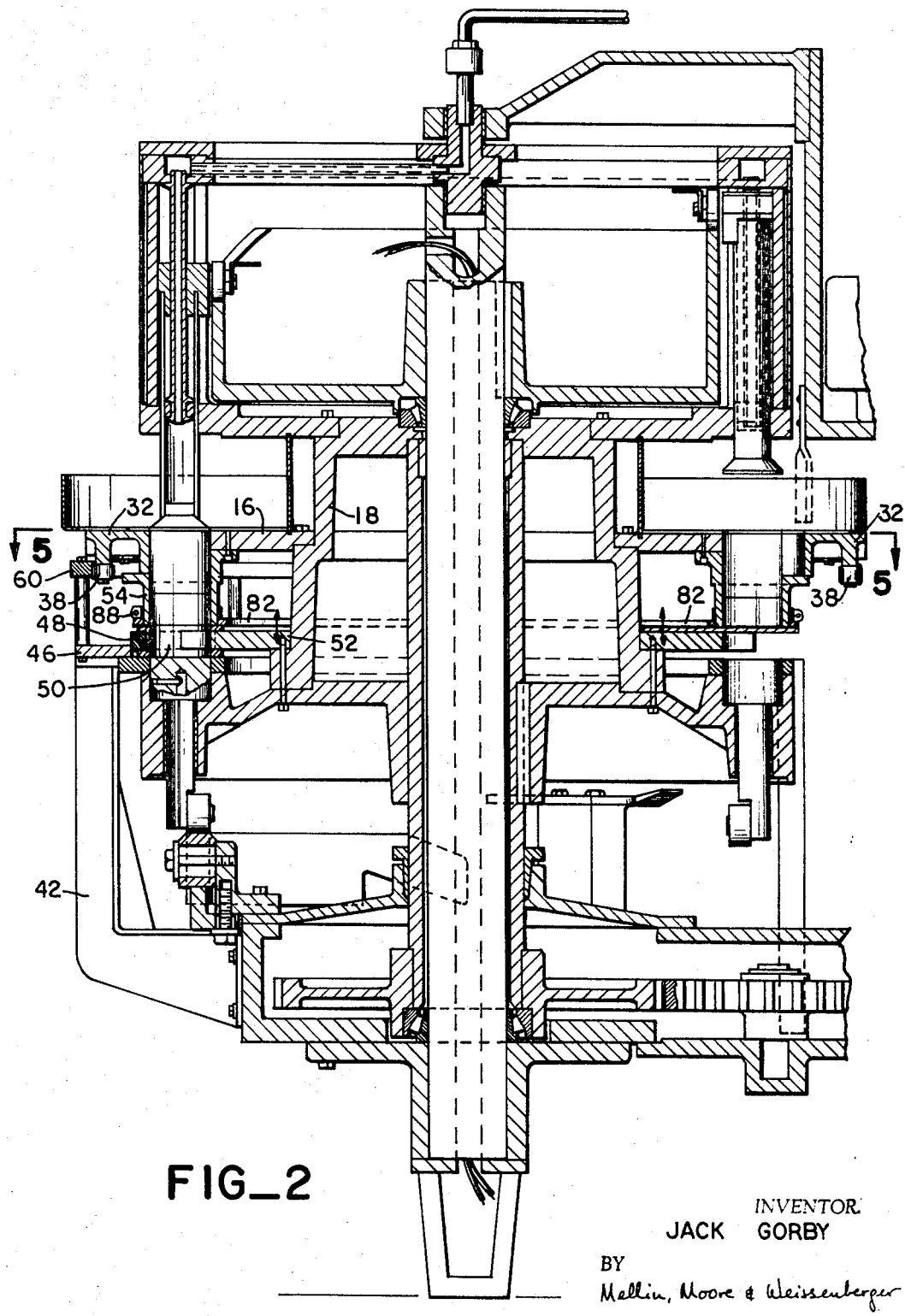

Nov. 4, 1969  J. GORBY  3,476,037
FOOD CANNING MACHINE
Filed April 5, 1968  7 Sheets-Sheet 3
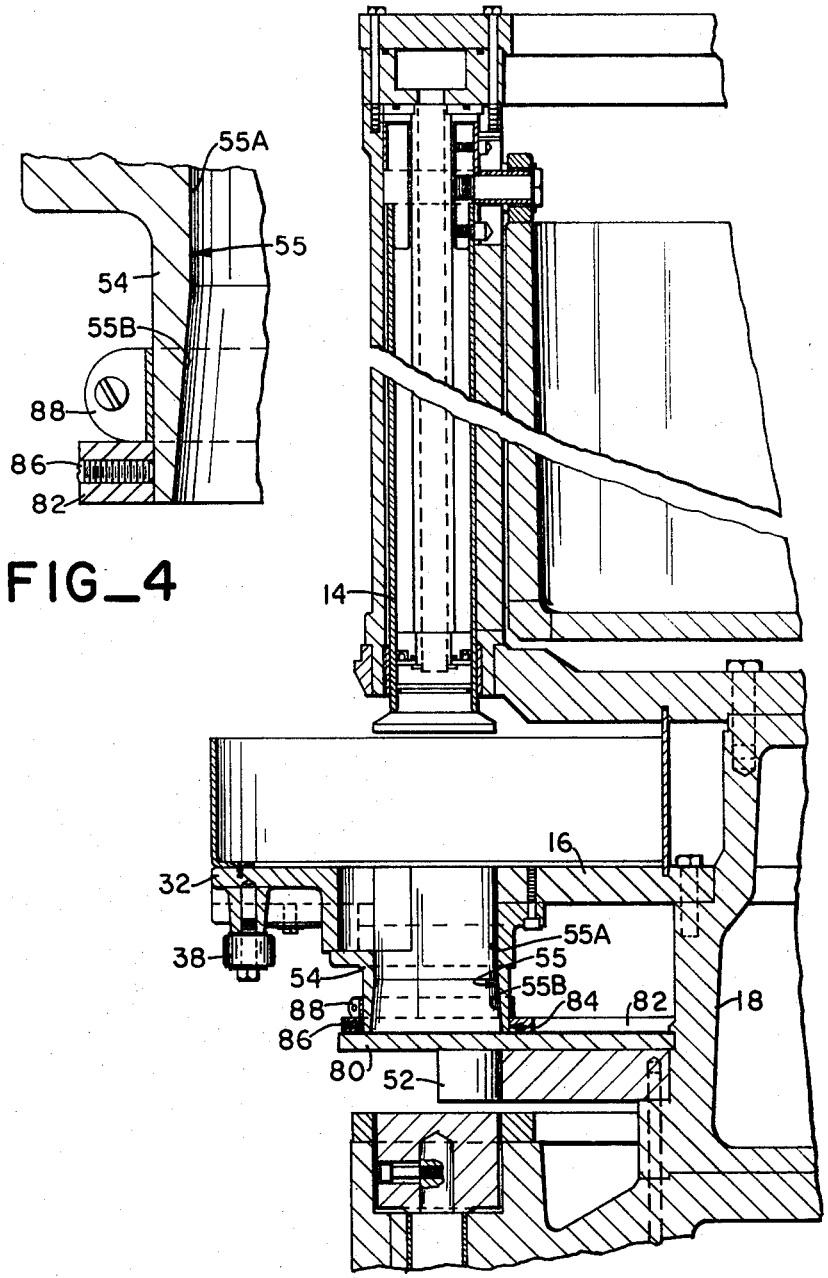
FIG_4
FIG_3
INVENTOR.
JACK GORBY
BY
Mellin, Moore & Weissenberger
ATTORNEYS

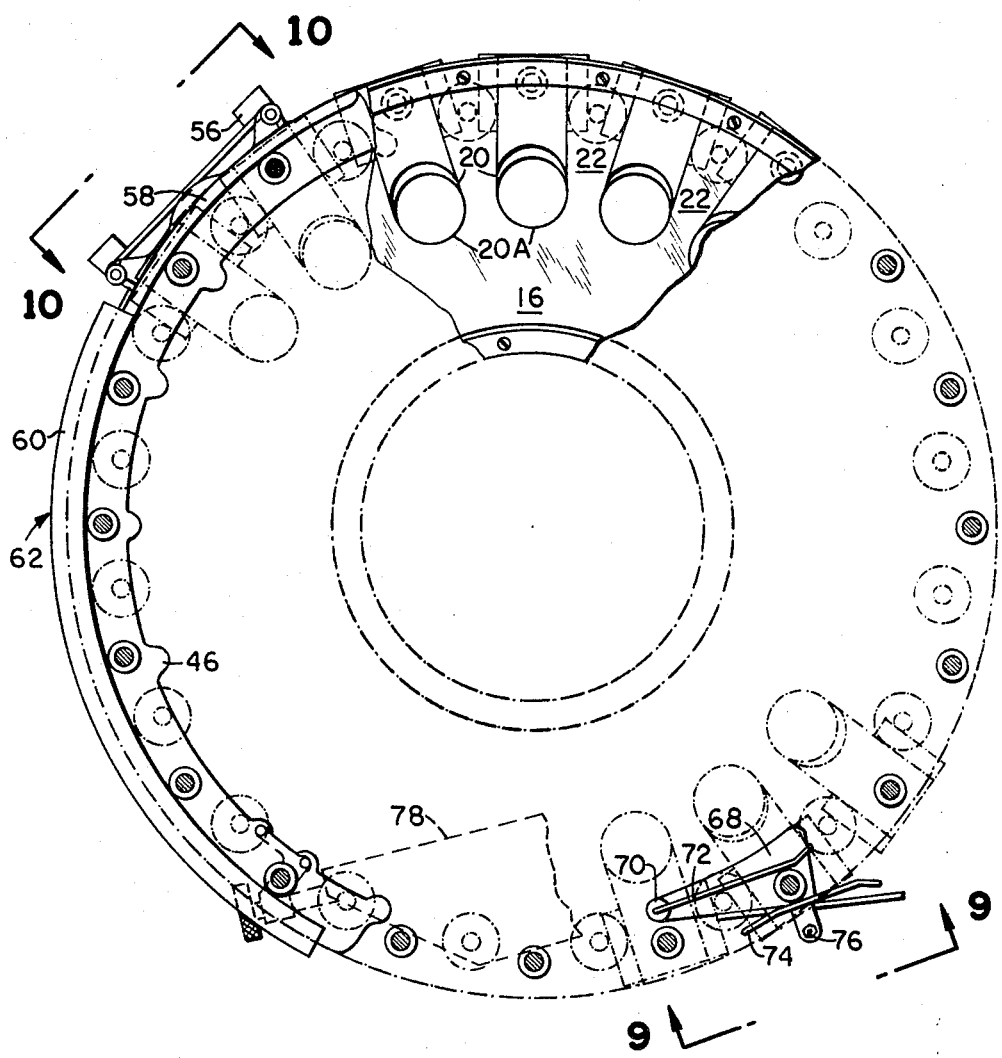
FIG_5

Nov. 4, 1969     J. GORBY     3,476,037
FOOD CANNING MACHINE
Filed April 5, 1968     7 Sheets-Sheet 5
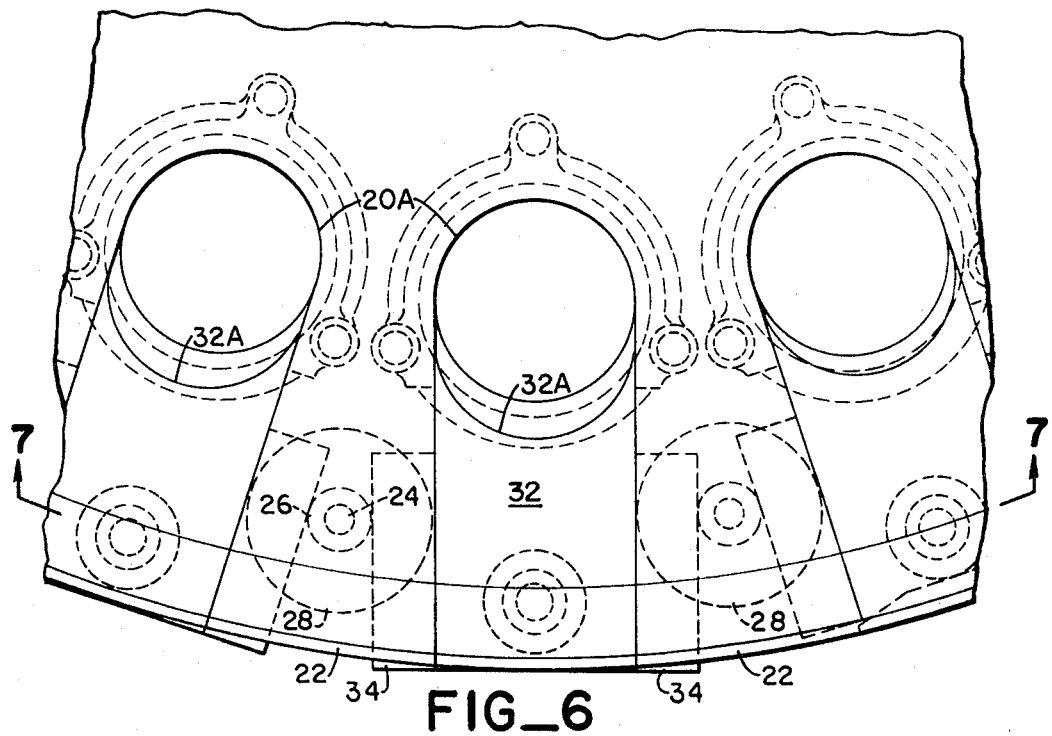
FIG_6
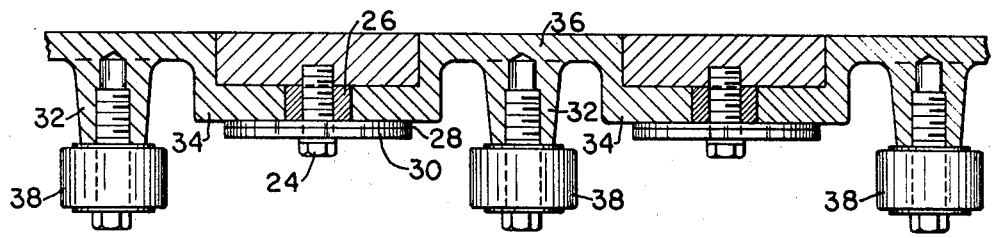
FIG_7
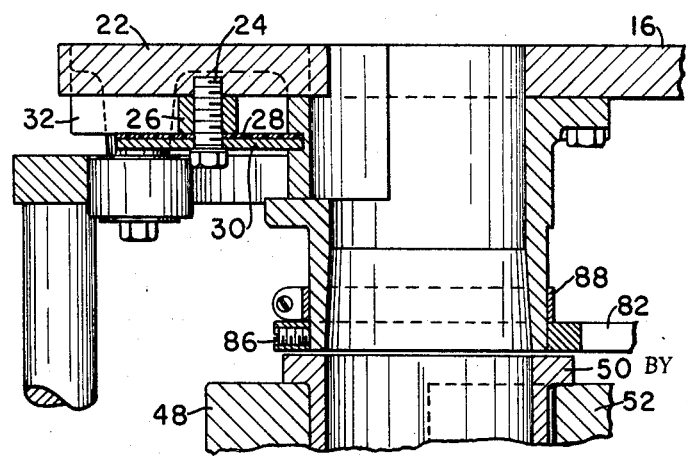
FIG_8
INVENTOR.
JACK GORBY
BY
Mellin, Moore & Weissenberger
ATTORNEYS

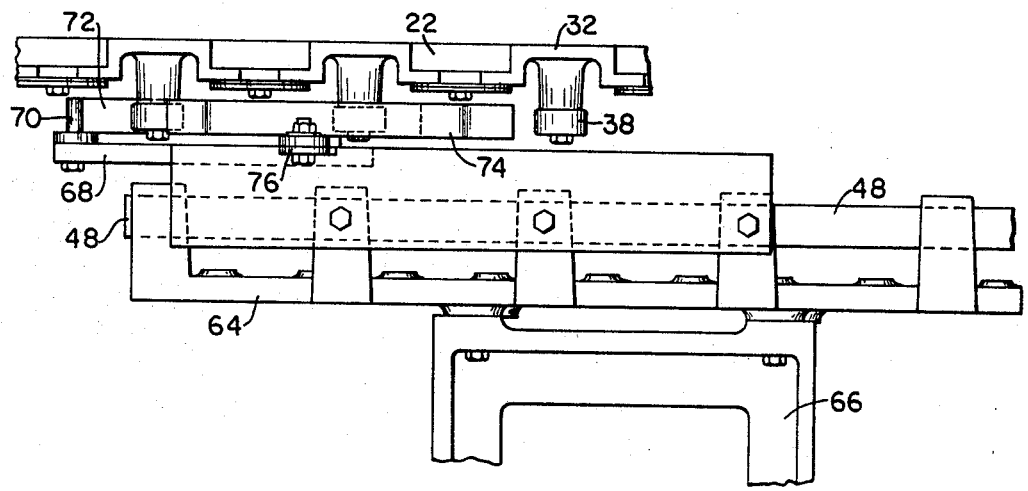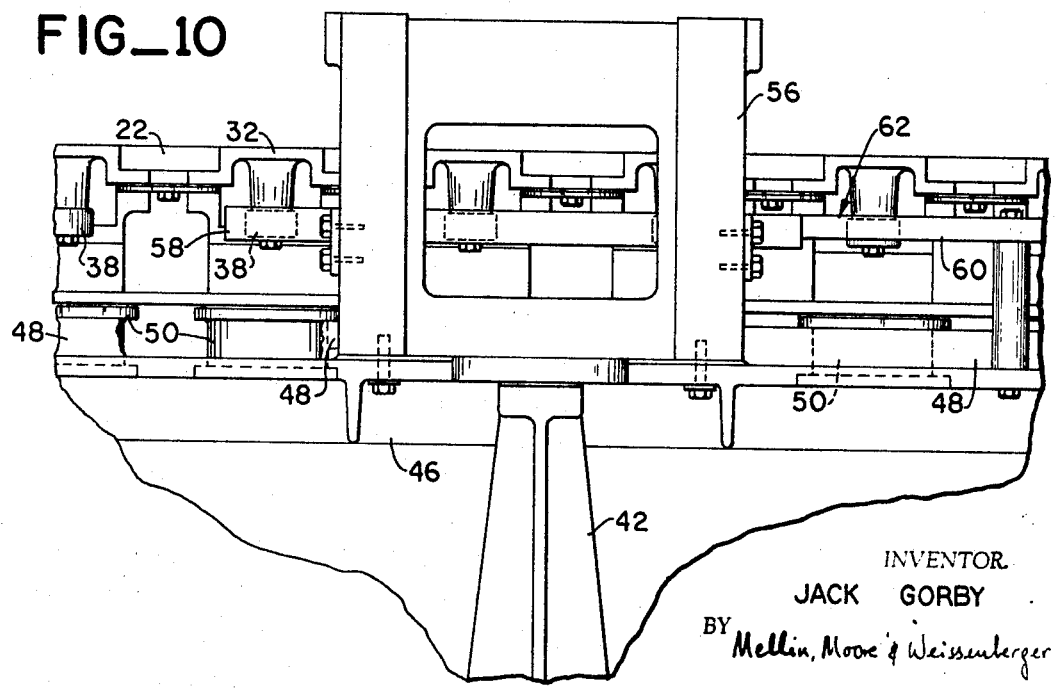

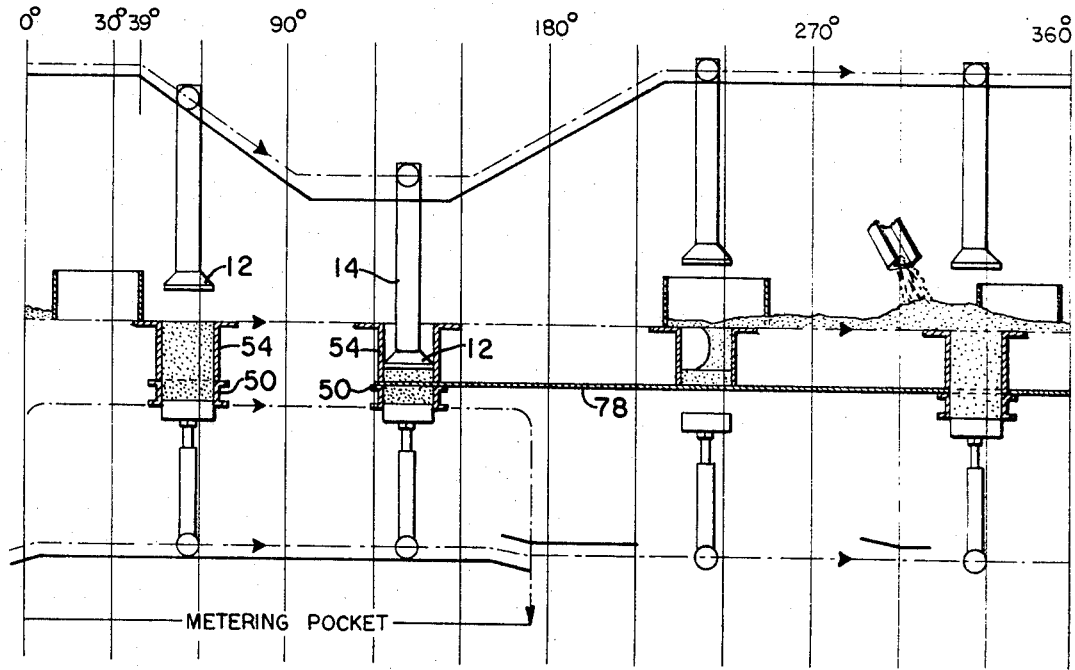
FIG_11
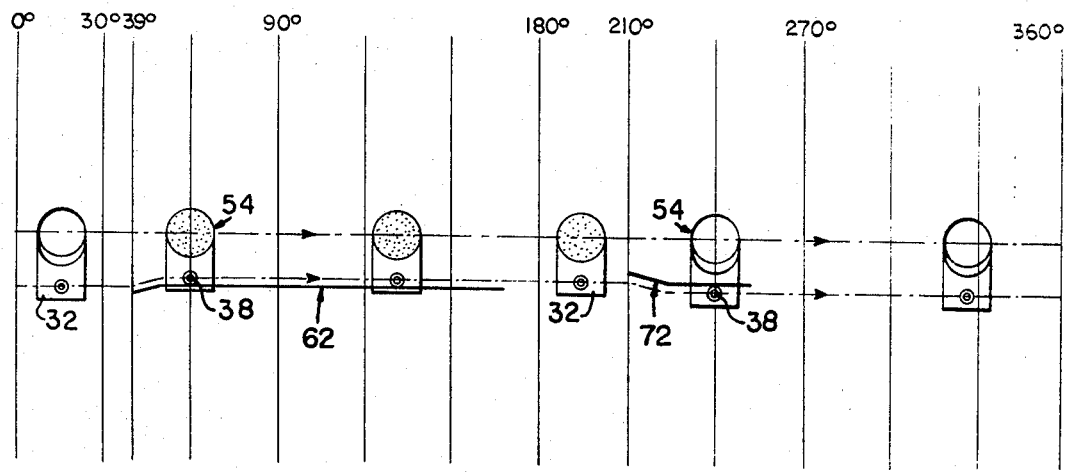
FIG_12

United States Patent Office 3,476,037
Patented Nov. 4, 1969

3,476,037
FOOD CANNING MACHINE
Jack Gorby, 525 N. Bellagio Terrace,
Bel Air, Calif. 90049
Filed Apr. 5, 1968, Ser. No. 719,007
Int. Cl. B30b 7/04; B65b 1/24, 63/02
U.S. Cl. 100—223                                    6 Claims

ABSTRACT OF THE DISCLOSURE

A machine for canning food products, the machine having a number of rams each movable in an aperture to compress food therein, the machine further having a number of slide members each cooperating with a ram and movable transversely of the direction of movement of the cooperating ram into and from the food, whereby the slide members aid in compressing the food.

BACKGROUND OF THE INVENTION

This invention relates to can filling machines, and more particularly to a machine used for canning fish, meat or any substantially homogeneous and compressible food product.

This invention relates to improvements in can filling machines as described in United States Patent No. 3,179,041. In that specification, a food canning machine similar to the present mechanism is disclosed. That is, the machine utilizes a pair of turrets, one for forming a compressed slug of food from loose and unconfined food material, and a second turret for transferring slugs of food from metering pockets into cans, as does the present machine. The improvements disclosed herein relate to the slug-forming turret, and consequently only that turret will be described in detail. Reference is made to United States Patent No. 3,179,041 for explanation of operation of the turret for transferring slugs of food from metering pockets into cans.

The slug-forming turret herein is similar to other machines of its kind in that a number of rams are circumferentially arranged on the turret to compress loose food into a metering pocket. Also, similar to the teachings of United States Patent No. 3,179,041, the slug-forming turret utilizes metering pistons that are moved into and out of tthe metering pockets as the turret rotates. The ram and piston assemblies are, of course, provided to compress the loose food of non-uniform density into a slug of food of substantially uniform density and of proper size for canning.

In the canning of yellowfin tuna, or other tuna of relatively firm texture, the previous machine has been found capable of providing a high degree of uniformity of food slugs. However, in order to avoid the possible depletion of certain species of tuna, such as yellowfin, it has been increasingly necessary to rely on tuna of relatively less firm texture, such as skipjack. The previous machine has not proven entirely satisfactory in canning the less firm tuna, because an excessive degree of deformity and breakage thereof takes place.

It is an object of this invention to provide apparatus which is capable of operating on tuna of relatively soft texture to provide individual slugs thereof of a high degree of uniformity, meanwhile keeping deformation and breakage thereof to a minimum.

In the machine of United States Patent No. 3,179,041, each ram acts in a cylindrical aperture to compress the food therein. It has been found that, due to the cylindrical shape of such apertures, a degree of jamming of the compressed food against the walls of the cylinder occurs during the compression stroke, resulting in a less smooth operating cycle than is desirable.

It is a further object of this invention to provide apertures in which the rams act which promote smoothness of operation of the machine during the compression stroke of each ram.

SUMMARY OF THE INVENTION

In a machine for canning food products, the machine having a plurality of rams each movable in an aperture to compress food therein, a plurality of slide members each cooperating with a ram and movable transversely of the direction of movement of the cooperating ram into and from the food, means for moving each slide member into the food to thereby compress it, and means for moving each slide member from the food after it has been compressed.

BRIEF DESCRIPTION OF THE DRAWINGS

These and other objects of the invention will become apparent from a study of the following description and drawings, in which:

FIG. 1 is a side elevation of the slug-forming turret of the machine;

FIG. 2 is a vertical section of the slug-forming turret of the machine;

FIG. 3 is an enlarged vertical section of a portion of the slug-forming turret;

FIG. 4 is an enlarged vertical section of a portion of the slug-forming turret shown in FIG. 3;

FIG. 5 is a view taken along the line 5—5 of FIG. 2, with portions removed, showing the slide members and the operating cams;

FIG. 6 is a fragmentary plan view of the slide members;

FIG. 7 is a section taken along the line 7—7 of FIG. 6;

FIG. 8 is another enlarged vertical section of a portion of the slug-forming turret;

FIG. 9 is a view taken along the line 9—9 of FIG. 5;

FIG. 10 is a view taken along the line 10—10 of FIG, 5;

FIG. 11 is a schematic elevation illustrating the turret operation and movement of the slug-forming rams and metering pistons for one rotation of the slug-forming turret;

FIG. 12 is a schematic elevation illustrating movement of the slide members for one rotation of the slug-forming turret.

DESCRIPTION OF THE PREFERRED EMBODIMENT

In general, the turret 10 for forming a metered slug of food product is shown in FIG. 1. Within less than one rotation of the turret 10, food deposited therein is compressed by slug-forming pistons 12 of rams 14 (FIG. 11), as described in United States Patent No. 3,179,041. Circular plate 16, on which the food is deposited, is shown in FIG. 5. The plate 16 is bolted to housing member 18 to rotate therewith, and has about its periphery a number of cut-out portions 20. Each of these cut-out portions 20 extends inward along a radius of the circle of circular plate 16 from the periphery thereof, and terminates in a semicircular portion 20A (FIGS. 6–8). The cut-out portions 20 define a plurality of tongues 22 which decrease in width toward the center of the circle of circular plate 16. Threadedly connected to the bottom of each tongue 22 is a bolt 24 having a spacer 26 thereon, a nylon washer 28 of relatively large diameter, and a steel washer 30 under the nylon washer 28 to support it.

As best shown in those FIGS. 5–8, slidably fitted into each cut-out portion 20 is a slide member 32. Each slide member 32 has a pair of feet 34 which is supported by and slidable over nylon washers 28, and an upper portion 36, the upper surface of which is flush with the upper surface of plate 16. The inner end of each slide member 32 defines a semicircular portion 32A which cooperates with a semicircular portion 20A of a cut-out portion 20 of plate 16. Bolted to the bottom portion of each slide member 32 is a roller 38. It will be seen that each slide member 32 is slidable along a radius line of the plate 16.

Fixed to the base portion 40 is an upwardly extending non-rotating arm 42 which extends to adjacent the periphery of plate 16. Bolted to the arm 42 and a similar arm 44 is an arcuate member 46 best shown in FIGS. 5 and 10. The arcuate member 46 has bolted thereto an arcuate side rail 48 which acts to hold metering pockets 50 from moving outward relative to turret 10. The metering pockets are carried around by a star-wheel 52 fixed to turret housing 18. Each slide member 32 cooperates with a receiving container 54 which defines an aperture 55, the receiving container 54 moving along with the slide member 32 as the turret 10 rotates, and each receiving container 54 cooperates with a metering pocket 50 as disclosed in the above-mentioned patent, the metering pocket 50 being moved by star-wheel 52.

Fixed to the arcuate member 46 is a bracket 56. Fixed to the bracket 56 inward thereof is an arcuate cam portion 58. Supported by arcuate member 46 is a second arcuate cam portion 60. The cam portions 58, 60 are joined end-to-end to form an arcuate cam member 62. The cam member 62 is disposed at the height of rollers 38 to cooperate therewith as described later. As shown in FIG. 5, the cam member 62 extends about approximately one-third of the turret 10 periphery.

In FIG. 9 is shown a portion of the turret 10 opposite the portion shown in FIG. 10. Arcuate side rail 48 is supported by a bracket 64 which in turn is fixed relative to base portion 40 by means of brace 66. Also supported by the bracket 64 is a plate 68 having a pin 70 fixed thereto and extending upward therefrom. This pin 70 is a pivot point for adjustable cams 72 and 74 which are in fixed relationship to each other by a tie bar and disposed at the height of rollers 38 to cooperate therewith. Cams 72 and 74 are adjustably mounted to plate 68 so that the amount of opening or backward movement of slide member 32 can be predetermined. The tie bar fixed to cams 72 and 74 is slotted to permit adjustment and secured to plate 68 by means of fastener 76 through the slot.

The operation of the device can best be understood by reference to FIGS. 5, 11 and 12. FIG. 11 shows the operating cycle of the rams 14 as disclosed in the above-mentioned patent, and reference may be had to it for a complete description of that cycle. For present purposes, it is important to note that, when a ram 14 associated with any given receiving container 54 starts its descent to compress food into the associated metering pocket 50, the roller 38 of the slide member 32 associated therewith contacts cam portion 58 of cam member 62, and slide member 32 moves inwardly transversely of the direction of movement of the ram 14, to compress the food. The slide member 32 is held in position by the cam member 62 while the ram 14 moves further downward to compress the food. Ram 14 is then removed from the food and, after it has been completely removed, cam members 72 and 74 act on roller 38 to move the slide member 32 back to its original position. This back movement occurs after knife 78 has acted to cover the bottom of receiving container 54. Each slide member 32 and associated ram 14, of course, cooperate in a similar manner.

As shown in FIGS. 3 and 4, the apertures 55 defined by receiving containers 54 each have a cylindrical portion 55A and a non-cylindrical portion 55B. Each non-cylindrical portion 55B is of frusto-conical configuration. That is, it tapers outward from the cylindrical portion 55A in the direction of ram 14 movement during compression of food thereby.

Incorporation of such a taper has proved advantageous over the prior machine. It has been found that, because of this feature food fills the receiving containers 54 more easily and evenly under its own weight, and that proper compression of the food by rams 14 takes place, with no jamming of food within the receiving containers 54.

A further feature of the invention is the incorporation of an adjustment feature (FIGS. 3 and 4) which cooperates with a dead plate 80 and the knife 78, both of which function in a manner similar to that disclosed in the previous patent. As will be noted in the patent, the bottom of each receiving container 54 passes over the upper surface of knife 78 and dead plate 80 in close proximity thereto, the knife 78 and dead plate 80 acting to properly hold the food in the receiving containers 54. The adjustment feature comprises a circular plate 82 having a plurality of apertures 84 therein adjacent its periphery, the plate being disposed so that each receiving container 54 is disposed within an aperture 84. The plate 82 is movable to a certain extent up and down as shown in FIG. 2, and locking screws 86 are provided about its periphery to bear against the receiving containers 54 and fix the position of the plate 82 relative to the receiving containers 54 (and the upper surfaces of dead plate 80 and knife 78). This plate 82 may thus be brought into proper proximity with the dead plate 80 and knife 78 to take up for wear of the bottoms of the receiving containers 54.

It has been found preferable to provide a clamp 88 around every fourth or fifth receiving container 54 to aid in the fixing of the position of the plate 82. This is advantageous because it is then not required to tighten the locking screws 86 to a great extent, insuring that no warping of the apertures 55 defined by receiving containers 54 takes place.

The improvement of providing a slide member 32 to cooperate with each receiving container 54 as described above has been found to be particularly advantageous. Each slide member 32, when in an open position, provides a larger opening to receive the loose tuna chunks than in the previous machine. This larger opening results in a lower force being necessary to deposit an equal amount of product therein. The lowering of force results in the lessening of breakage of the tuna chunks, which is most important when relatively soft tuna, such as skipjack, is being packed. A further advantage is that the side pressure of each slide member 32 rearranges the tuna chunks upon which it acts so that when the ram acting in conjunction therewith compresses the tuna chunks, there is much less deformation of the chunks than would be possible without such radial slide members. This reduction in deformation results in substantially less breakage of the tuna chunks, and results in a highly uniform slug of tuna.

Having thus described my invention, I claim:

1. In a machine for canning food products, said machine having a plurality of rams each movable in an aperture to compress food therein,
    (a) a plurality of slide members each cooperating with a ram and movable transversely of the direction of movement of the cooperating ram into and from the food;
    (b) means for moving each slide member into the food to thereby compress it; and
    (c) means for moving each slide member from the food after it has been compressed.

2. A machine according to claim 1 wherein the means for moving each slide member into and from the food comprises cam means including a cam track and cam followers attached respectively to each slide member and movable along the cam track.

3. A machine according to claim 2 wherein is included a rotatable turret for mounting and rotating the rams and slide members, and wherein the cam track comprises a stationary first cam member for moving each slide member into the food by means of its cam follower, and a second cam member for moving each slide member from the food by means of its cam follower.

4. A machine according to claim 3 wherein each aperture has a portion cylindrical in configuration to coact with the ram as it initially compresses the food, and a tapered portion extending from the cylindrical portion in the direction of ram movement during further compression of the food, said tapered portion being outwardly tapered from the cylindrical portion.

5. A machine according to claim 1 wherein each aperture has a portion cylindrical in configuration to coact with the ram as it initially compresses the food, and a tapered portion extending from the cylindrical portion in the direction of ram movement during further compression of the food, said tapered portion being outwardly tapered from the cylindrical portion.

6. A machine according to claim 5 wherein the tapered portion of each aperture is frusto-conical in configuration.

References Cited

UNITED STATES PATENTS

| | | | |
|---|---|---|---|
| 3,026,660 | 3/1962 | Luthi et al. | 53—124 |
| 3,123,958 | 3/1964 | Carruthers | 141—81 XR |
| 3,179,041 | 4/1965 | Luthi et al. | 100—223 |
| 3,213,901 | 10/1965 | Luthi et al. | 141—73 XR |
| 3,371,689 | 3/1968 | Carruthers | 100—223 XR |

BILLY J. WILHITE, Primary Examiner

U.S. Cl. X.R.

18—20; 53—124; 100—232, 264; 141—73